March 29, 1960     R. V. KLINT     2,930,581

DAMPING TURBINE BUCKETS

Filed Dec. 30, 1953

INVENTOR.
Robert V. Klint,
BY
*Paul A. Frank*
His Attorney.

United States Patent Office 2,930,581
Patented Mar. 29, 1960

2,930,581

DAMPING TURBINE BUCKETS

Robert V. Klint, Schenectady, N.Y., assignor to General Electric Company, a corporation of New York Application December 30, 1953, Serial No. 401,252

2 Claims. (Cl. 253—77)

This invention relates to fluid turbines and, more particularly, to the vibration damping of buckets used in gas turbines.

One of the serious problems met in gas turbine operation is the tendency of the turbine buckets to fracture when subjected to a vibrational stress at or near resonant frequency. In many installations, gas turbines are operated under conditions of frequent acceleration and deceleration. During acceleration or deceleration of the turbine, the buckets are, momentarily at least, subjected to vibrational stresses at their fundamental resonant frequency and in many cases to vibrational stresses at higher resonant frequencies. When a bucket is subjected to a vibrational stress at or near its resonant frequency, its amplitude of vibration can readily build up to a point where fatigue fractures occur. Such fractures have readily occurred in the very tough and heat-stable metals or alloys from which turbine blades are fabricated.

The buckets which are most prone to fracture are those which are rigidly positioned in the turbine disk. In most cases, the presence of a slight fracture caused by vibration results in a damping effect which helps to safeguard the blade from further vibrational deterioration. However, the protection afforded by the damping effect of the fracture does not prevent further slow progress of the fracture, and it is not unusual for a portion of a turbine bucket to be broken off entirely. This condition decreases the efficiency of energy conversion and unbalances the turbine disk thereby increasing vibration. The desirability of damping turbine buckets to resist the fracturing effect of a vibrational stress at or near the resonant frequency vibration of the bucket, is obvious.

Accordingly, it is an object of this invention to provide a turbine rotor and bucket assembly which will resist fracture of the buckets when a vibrational stimulus is applied thereto.

It is another object of this invention to provide a new and improved rotor and bucket assembly for use in a gas turbine.

It is a further object of the invention to provide a turbine bucket assembly which utilizes friction forces to achieve damping.

Briefly stated, in accordance with one of its aspects, this invention comprises a turbine rotor and bucket assembly wherein loose-fitting loading pins are provided in radially directed slots in the rotor beneath the bucket mountings to damp the vibrations of the buckets.

These and various other objects, features and advantages of the invention will be better understood from the following description taken in connection with the accompanying drawing in which, Fig. 1 is a sectioanl view of a preferred embodiment of my invention applied to a turbine rotor and blade assembly structure;

Figure 1:
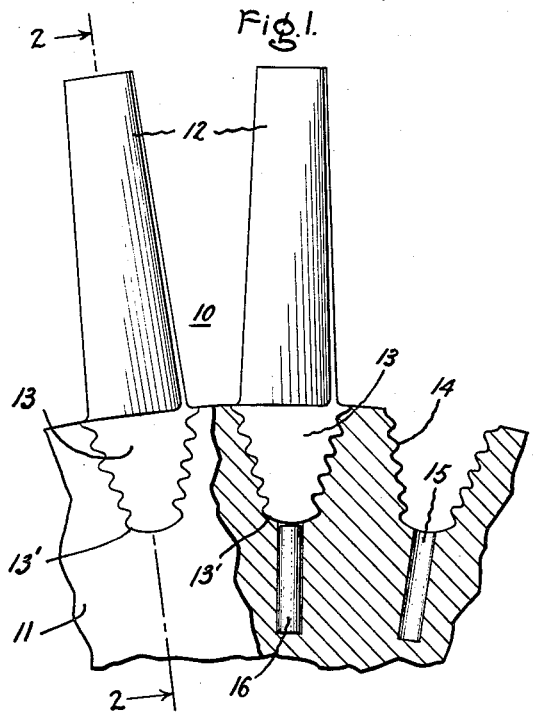
Figure 2:
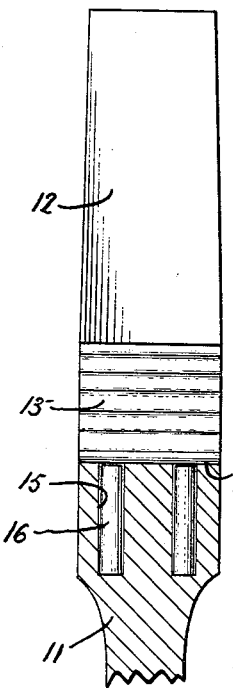
Fig. 2 is a sectional view taken along the lines 2—2 of Fig. 1.

Referring to Figs. 1 and 2 in the drawing, a turbine rotor and bucket assembly, which can be used in gas turbine construction or where the buckets are applied to the wheel axially, is indicated generally at 10, comprising a rotor or turbine disk 11 having a plurality of buckets or blades such as 12 mounted in uniform spacing around the periphery thereof. Each of the blades or buckets 12 consists of an elongated body contoured to convert a portion of the kinetic energy of a passing fluid stream to rotational mechanical energy. The blade 12 may be mounted on the disk 11 by means of a blade base or dovetail 13 having a fit with a disk dovetail 14. While an axial dovetail-type of base or mounting is illustrated, it is obvious that many of the types of mountings would be entirely satisfactory where the bases are retainably positioned in disc slots.

One or more holes indicated at 15 are drilled radially into the turbine disk or rotor 11 at the bottom of each of the dovetail slots 14. The longitudinal axes of the holes are in alignment with or parallel to the longitudinal axes of the blades and bases and the disk material defines the enclosing side walls and bottom of the holes 15 with the hole opening being adjacent the base undersurfaces 13′. The holes are thus parallel to the plane of the disk and extend radially therein. Such an arrangement is illustrated in Figs. 1 and 2. The number of holes and their diameter should be a maximum for a given wheel and still maintain wheel strength. These holes have a sole unobstructed opening into the slot 14 and the opening is directly beneath the undersurface 13′. Loose-fitting pins 16 are provided for the holes 15, and are preferably composed of the same material as the wheel. The pins 16 may also be of a material with a lower coefficient of thermal expansion to insure looseness of fit at running temperature. The bucket 12 is then inserted into the wheel in the conventional manner by means of its dovetail mounting 13 and held in place thereby. The pins 16 are of the nonfastening variety in that they do not fasten, or are not utilized as fastening means to maintain the mounting of the blades.

In operation, when the turbine wheel or rotor is turning, centrifugal force causes the pins 16 to bear on the undersurface 13′ of the dovetail mounting 13 of the bucket 12. The bucket 12 will have some degree of movement in the slot 14 due either to looseness in the slot 14 or to elastic deformation of the bucket dovetail 13. Relative motion of the bucket dovetail 13 over the loading pins 16 will cause damping of the vibration. These frictional forces tend to damp the vibrations thereby limiting the amplitude thereof.

The pins 16 are self-adjusting for any wear on the ends of the pins because of their looseness and radial movement. The loose fit of the pins is accomplished by having their dimensions, length and diameter of cylindrical pins, less than those of the hole. It is not necessary to have close fits or tolerances on the sizes of the pins or of the fits against the buckets. The size of the pins 16 may be varied to help in balancing the rotor and to vary the mass of the pin, thus affecting its inherent damping ability for a given area of contact.

Figure 3:
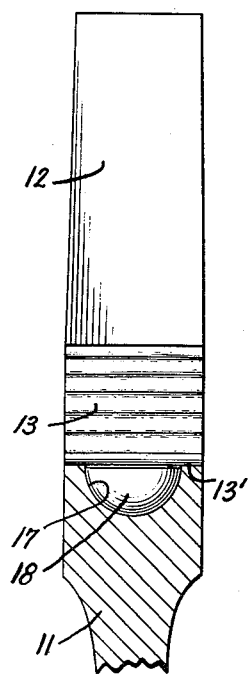
Fig. 3 is a sectional view of a modified turbine rotor and bucket assembly structure.
Figure 4:
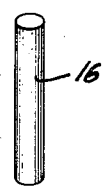
Fig. 4 is a perspective view of a radial loading pin shown in Figs. 1 and 2.
Figure 5:
Fig. 5 is a perspective view of the damping block shown in Fig. 3.

Fig. 3 is a modification of a turbine rotor and bucket assembly used to provide additional damping for the turbine bucket vibration comprising a block of metal inserted in a milled-out slot in the turbine disk or rotor beneath the turbine bucket dovetail. The construction and operation of both the preferred embodiment of Fig. 1 and the modification of Fig. 3 are similar with the exception of the insertion of a block of metal rather than a radial loading pin to provide damping of the bucket vibrations.

As in Fig. 1, a turbine rotor and bucket assembly is shown as comprising a rotor or turbine disk 11 having a plurality of buckets or blades such as 12 mounted in uniform spacing around the periphery thereof. The bucket 12 may be mounted on the disk 11 by means of a blade dovetail 13 having a fit with a disk dovetail 14. A slot 17 is milled out in the turbine disk 11 at the bottom of the dovetail slot 14. A loose-fitting block 18 is provided for the slot 17. The block 18 is preferably composed of the same material as the rotor 11 or of a material with a lower coefficient of thermal expansion to insure looseness of fit at running temperature. The bucket 12 is then inserted into the rotor or wheel in the conventional manner by means of its dovetail mounting 13 and held in place. Greater damping of bucket vibrations is provided by the metal block because of the increased surface area which is exposed to rubbing. In addition, any movement of the block or pin in its slot or hole will also dissipate energy by rubbing friction and impact. The mass of the block 18 may be adjusted for a given design. These frictional forces tend to damp the vibrations thereby limiting the amplitude thereof. The operation of the rotor and bucket assembly disclosed in Fig. 3 is identical with the operation of the rotor and bucket assembly as fully disclosed above in reference to Fig. 1. Accordingly, the detailed description is not repeated for Fig. 3.

Figure 6:
Fig. 6 is a perspective view of a modified damping block.

Fig. 6 is a modification of a damping block wherein an adjustment of the mass for a given design is possible. The damping block 19 is shown in the form of a cylindrical section, such as a Woodruff key. In a turbine rotor and bucket assembly such as shown in Figs. 1 and 3, the block 19 would operate in a manner similar to pins 16 and block 18 to provide bucket damping.

As will be apparent to those skilled in the art, the objects of my invention are attained by the use of loose-fitting radial pins or metal blocks inserted in apertures in the turbine rotor located beneath the mountings of the turbine buckets.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A non-fastening vibration damping means operable to absorb vibration by rubbing friction between a rotor disc and a blade thereon which comprises in combination, a rotor disc having a circumferential row of slots in the periphery thereof, a circumferential row of blades positioned on said disc, each of said blades having a base on one end retainably positioned in each of said slots to have some degree of movement therein, said bases having an undersurface adjacent the bottom of said slots, said disc having a radially inwardly extending hole beneath the undersurface of each of said bases, said disc defining enclosing side walls and bottom of said holes with the opening of said holes adjacent the undersurface of said blade bases, said holes having their longitudinal axis parallel to the plane of the disc, and a loose fitting pin member positioned in each of said holes for sliding movement therein so that rotation of said turbine disc causes said pin members to move radially outwardly to frictionally engage the undersurface of said blade bases to thereby dampen the vibration of said blade.

2. A non-fastening vibration damping means operable to absorb vibration by rubbing friction between a rotor disc and blades mounted thereon which comprises in combination, a rotor having a circumferential row of slots in the periphery thereof, said rotor having a radially extending cylindrical hole formed in the bottom of each of said slots, the longitudinal axis of said hole being parallel to the plane of the said disc and extending radially therein, a cylindrical pin slidably positioned in each of said holes, said pins having a length and diameter of less than that of the said holes, each of said blades having a base portion retainably positioned in said slots, said base portions having an undersurface covering the opening of said holes such that rotation of said rotor moves said pins radially outwardly to frictionally engage the said blade bases undersurfaces to absorb vibration by rubbing friction.

References Cited in the file of this patent

UNITED STATES PATENTS

| | | |
|---|---|---|
| 952,317 | Eyermann | Mar. 15, 1910 |
| 1,619,133 | Kasley | Mar. 1, 1927 |
| 2,310,412 | Flanders | Feb. 9, 1943 |
| 2,595,829 | Dean | May 6, 1952 |
| 2,618,460 | Williams | Nov. 18, 1952 |
| 2,643,853 | Redding | June 30, 1953 |
| 2,651,494 | Persson | Sept. 8, 1953 |
| 2,753,149 | Kurti | July 3, 1956 |

FOREIGN PATENTS

| | | |
|---|---|---|
| 241,993 | Switzerland | Sept. 2, 1946 |
| 834,408 | Germany | Mar. 20, 1952 |
| 976,790 | France | Nov. 1, 1950 |